March 1, 1938.  A. J. MORIN  2,109,889
WALLPAPER TRIMMING MACHINE
Filed April 1, 1937
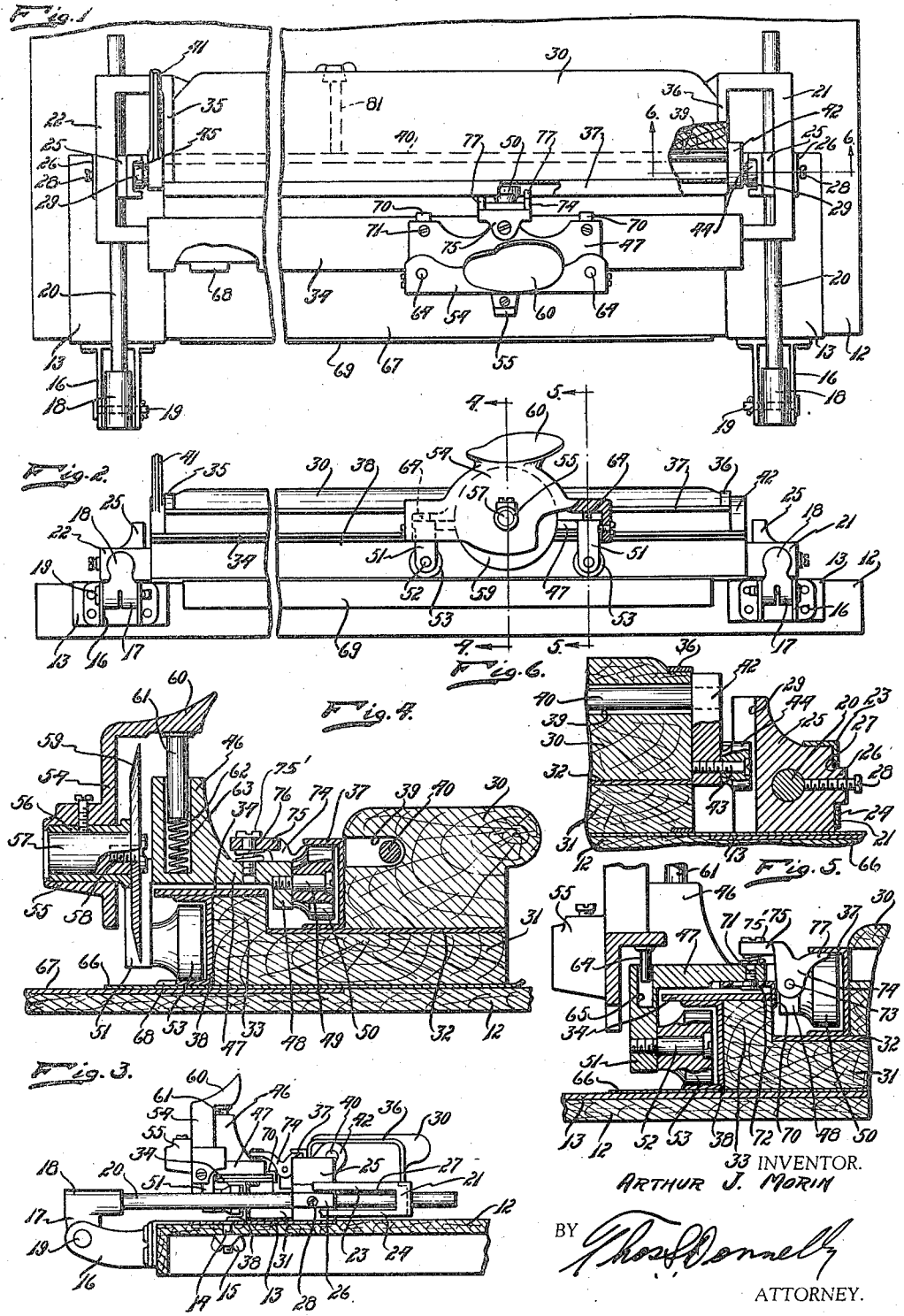
INVENTOR.
ARTHUR J. MORIN
BY Thos. J. Donnelly
ATTORNEY.

Patented Mar. 1, 1938

2,109,889

UNITED STATES PATENT OFFICE 2,109,889

WALLPAPER TRIMMING MACHINE

Arthur J. Morin, Detroit, Mich.

Application April 1, 1937, Serial No. 134,402

11 Claims. (Cl. 164—73)

My invention relates to a new and useful improvement in a wallpaper trimming machine adapted for use in trimming the edges from wallpaper. From a description of the invention it will appear obvious that the device may be also used for cutting paper, cloth, and the like, where it is desired to trim off of the material an edge portion and maintain a straight edge on the cutting line. It is an object of the present invention to provide a device of this class which will be simple, in structure, economical of manufacture, durable, compact, light, easily and quickly operated, possessed of a minimum number of parts and one in which the cutting element may be easily and quickly adjusted in various portions to align itself at the line at which the cut is intended to be made.

Another object of the invention is the provision of a cutting machine of this type in which a swingable carriage is mounted on a suitable work table so arranged and constructed that it may be easily and quickly swung to operative and inoperative position.

Another object of the invention is the provision in a cutting machine of this type of means for adjusting the cutting carriage so as to prevent oscillation or wobbling of the same.

Another object of the invention is the provision of adjusting means whereby the width of the portion cut from the material may be easily and quickly adjusted and determined, and the device locked in any desired position of cut.

Another object of the invention is a provision in a cutting machine of this type of a track mounting so constructed and arranged that the free and easy movement of the carriage may always be afforded.

Other objects will appear herein.

The structure, operation, and nature, of the invention will appear from the description herein given in connection with the drawing forming a part hereof and in which, Fig. 1 is a top plan view of the invention with parts broken away and parts shown in section.

Fig. 2 is a front elevational view of the invention with a part broken away and a part shown in section.

Fig. 3 is an end elevational view of the invention with a part broken away and a part shown in section.

Fig. 4 is a sectional view taken on line 4—4 of Fig. 2.

Fig. 5 is a sectional view taken on line 5—5 of Fig. 2.

Fig. 6 is a fragmentary sectional view taken on line 6—6 of Fig. 1.

The invention is customarily used with a work table 12. Secured to this work table 12 are the metallic L-shaped members 13. For securing these members to the table 12, I have utilized the bolt 14 and the wing nut 15 as shown in Fig. 3. One of these L-shaped attaching members is used at each end of the device. Mounted on and projecting outwardly from each of these attaching members is a bracket comprising the spaced arms 16 between which projects the lugs 17 which extends outwardly from the fitting 18. A pin or bolt 19, projects through each of the arms 16 and through the lug 17 to swingably mount the fitting 18 thereon.

Secured to each of these fittings and projecting outwardly therefrom is a rod 20. In the invention I provide a carriage and at each end of this carriage I have formed a cage 21 and 22 constructed preferably of metal. The rods 20 project through openings formed in the ends of the cage so that the cage is thus slideably mounted on the rods 20. The outer side of each of these cages is slotted as at 27 to provide the oppositely spaced rails 23 and 24. Engaging in the slot 27 slideably is a boss 26 which projects outwardly from a block 25 and through which the rod 20 projects, the block 25 being slideable on the rod 20. A set screw 28 is provided for locking the block 25 in fixed relation on the rod 20. On the inner face of each of these blocks 25 is formed a channel or groove 29.

Each cage is secured to the end of a board 30 which is attached to the board 31 and spaced therefrom by the reenforcing metallic plate 32. The board 31 is provided at its forward end with the upwardly projecting portion 33 overlying which and secured thereto is a metallic plate 34. The inner rails 35 and 36 of the cages 22 and 21 respectively are secured to the metallic channel-shaped track-forming member 37. A similar channel-shaped metallic track member 38 is secured to the front face of the board 31.

Formed in the forward face of the board or rail 30 is a groove 39 through which extends a rod 40. This rod 40 projects beyond the opposite ends of the board 30. Fixedly mounted on one of the projecting ends of this rod 40 is a rocker arm 41 whereby the rod 40 may be rocked. Fixedly attached at one of its ends to one end of the rod 40 is a link 42 and secured to the other end of this link by means of the screw 43 is a roller 44 which snugly engages in the groove or channel 29. Fixedly mounted at the opposite end of the rod 40 is a link similar to the link 42 and projecting outwardly from the lower end of which is a roller 45 which engages in the groove 29 formed in the block 25. The construction is such that when the blocks 25 are locked in position by their respective set screws 28 on their respective rods 20 and the rod 40 is rocked by means of the rocker arm 41 the carriage may be slid inwardly or outwardly of the rods 20 depending upon the direction of the rocking of the rod 40.

A cutting tool slide support 46 is provided with a portion 47 which overlies and is spaced from the plate 34. Depending from portion 47 is a supporting tongue 48 to which is secured by means of a screw 49 a roller 50 which engages in the channel of the track 37. Projecting downwardly from this cutting tool slide support at the outer side of the same are the supporting plates 51 on each of which is mounted by a screw 52 a traction roller 53 which engages in the channel of the track 38.

A plate carrier or shield 54 is provided with the hub 55 in which engages a bushing 56. Slidably projecting through this bushing is the stub shaft 57 to which is fixedly attached by the screw 58 the cutting disc 59. The shield 54 is rearwardly, angularly turned at its upper end to provide the pressure plate 60, projecting downwardly from which is the pin 61 which slideably engages in the pocket 62 formed in the member 40. A spring 63 is positioned between the end of the pin 61 and the bottom of the pocket 62. The shield plate 54 also carries the guide pins 64 which engage in the pockets 65 formed in the members 51. The construction is such that upon a pressing downwardly the cutting disc 59 may be brought into contact with the paper 66 which is positioned upon the upper surface of the table 12 and which overlies the metal wear plate 67 mounted on the upper surface of this table 12. This metal wear plate may be made of sufficiently soft material so that the cutting edge of the cutting disc 59 will not be unduly dulled.

Projecting outwardly from the lower edge of the track 38 is the indicator tongue 68. Secured to the outer face of the table 12 and projecting slightly above the same is the straight edge or abutment plate 69.

Secured to the plate 47 and projecting rearwardly and then turned downwardly are guide strips 70 which are secured to the plate 47 by means of bolts 71 projected through a slot 72 formed in each of the guide strips. The construction is such that the guide strip 70 may be adjusted inwardly and outwardly from the edge of the portion 33 of the board 31 so as to compensate for such wear as may take place. Pivoted by the pin 73 to the depending portion 48 are a pair of spaced lugs 74 which embrace the portion 48 and project downwardly from the plate 75 which overlies the plate 47. A screw 75' is projected through an enlarged opening formed in the plate 75 and through a coil spring 76 and then threaded into the plate 47. A dog 77 projects outwardly and upwardly from each of the lugs 74 and is adapted to engage the inner surface of the upper rail of the channel track 37. The spring 76 makes this engagement a yielding one and thus the dogs 77 serve also to maintain the rollers 50 and 53 in engagement with the track so that wobbling or oscillation of the member 46 in its travel is prevented, thus the formation of a wavering line on the paper 66 by the cutting disc 59 is prevented.

In operation the screw 76 would be threaded downwardly sufficiently to assure a smooth travel of the member 46 lengthwise of the plate 34, that is lengthwise of the tracks 37 and 36.

In use the operator would first locate the blocks 25 in proper position on the rods 20 so that when the rocker arm 41 would be swung rearwardly the carriage would move the proper distance to bring the cutting disc 59 into the proper position. In using the device the operator would then swing the rods 20 outwardly so that the carriage and all of the parts assembled therewith would hang downwardly in front of the table 12. The paper to be cut would then be laid upon the table 12 and its edge brought into engagement with the inner face of the straight edge or abutment 69. The rods 20 would then be swung backwardly on their pivots so that the carriage would overlie the table and the board 31 would press upon the paper strip 66. The rocker arm 41 would then be rocked to move the carriage either forwardly or rearwardly to the proper distance as indicated by the indicator plate or tongue 68. When this would be done the operator would then press downwardly on the member 60 so as to bring the cutting disc 59 into contact with the paper 66. By moving the block 46 lengthwise of the tracks 37 and 38 while the cutting disc 59 is pressed downwardly the severing of the paper would result. It is obvious that when the paper is brought over against the straight edge or abutment 69 and the carriage properly adjusted the cutting off of an edge strip of the paper of uniform width can be repeated on various sheets of paper. This is particularly important in cutting wallpaper on which no marginal edge is provided. It it also believed obvious that the severing of the paper may be easily and quickly done resulting in a marked saving of time over other types of trimming machines and over the hand method of cutting. It will also be noted that the cutting disc 59 is spaced outwardly from all of the parts on which it is carried so that an undesirable wearing, clogging, or sticking of the cutting disc is prevented and a clean cut is always effected.

When the operator is to cut a pre-determined strip from various sheets of paper the device may be located in its adjusted form for a width of cut by threading the set screw 81 into engagement with the rod 40 so as to prevent the rocking of the same and thus the rocker arm 41 would be locked in a pre-determined position of adjustment.

The drawing and specification are believed to fully describe the nature and features of the invention. However, I wish it to be understood that, while I have shown one specific embodiment of the invention, other forms and constructions of the invention might be made embodying the features herein set out and it is not my intention to limit myself to the specific details shown but obtain all of the advantages of such variations and changes as may be determined properly to come within the claims appended hereto.

What I claim as new is:

1. A trimming machine of the class described, comprising: a carriage; means for swingably mounting said carriage on a support for swinging to lie upon the surface of said support, and for swinging upwardly and outwardly therefrom; a cam mechanism adapted upon swinging for moving said carriage inwardly and outwardly of the edge of said support; means for adjusting the position of said cam mechanism for varying the position of said carriage relatively to said support; means for locking said cam mechanism in its various positions of adjustment and rockable means for actuating said cam mechanism.

2. In a trimming machine of the class described, a carriage; a pair of spaced rods; means for mounting the opposite ends of said carriage slideably on said rods; means for pivotally connecting one of the ends of said rods to a support for mounting said carriage in position for swinging into position, for lying on said support, and for swinging upwardly and outwardly therefrom; and a cam mechanism for sliding said carriage longitudinal of said rods a predetermined distance.

3. In a trimming machine of the class described, a carriage; a pair of spaced rods; means for mounting the opposite ends of said carriage slideably on said rods; means for pivotally connecting one of the ends of said rods to a support for mounting said carriage in position for swinging into position, for lying on said support, and for swinging upwardly and outwardly therefrom; a cam mechanism for sliding said carriage longitudinal of said rods a predetermined distance; and means for locking said carriage on said rods at predetermined positions.

4. A trimming machine of the class described, comprising: a pair of spaced rods; means for swingably connecting one end of each of said rods; means for mounting said connecting means on a supporting body; a carriage slideably mounted upon and lying between said rods; a block slideably mounted on each of said rods; means for securing each of said blocks in fixed relation on the rod on which mounted; and rockable means associated with said carriage and said blocks for sliding said carriage on said rods longitudinally thereof a predetermined distance.

5. In a trimming machine of the class described, a carriage; a pair of rods projectable through opposite ends of said carriage, a rockable member for sliding said carriage longitudinal of said rods a predetermined distance; and means for locking said rockable member against rocking movement.

6. A trimming machine of the class described, comprising: a carriage; a pair of rods, said carriage lying between said rods and said rods projecting through opposite ends of said carriage; means for swingably mounting one end of said rods on a supporting body for permitting a swinging movement of said carriage upon the upper surface of said body and upwardly and outwardly therefrom; means for locking said carriage against free slideable movement on said rods; and rockable means for sliding said carriage on said rods a predetermined distance subsequent to the locking of said locking means.

7. In a trimming machine of the class described, a pair of spaced horizontally off-set tracks; a cutting tool slide support; rollers carried by said cutting tool slide support; some of said rollers engaging in one track and others in the other track; and adjusting means for adjusting the engagement of said rollers in said tracks.

8. In a trimming machine of the class described, a pair of spaced horizontally off-set tracks; a cutting tool slide support; rollers carried by said cutting tool slide support; some of said rollers engaging in one track and others in the other track; adjusting means for adjusting the engagement in said rollers in said tracks, and a rotatable cutting tool mounted on said cutting tool slide support and movable vertically thereof.

9. In a trimming machine of the class described, a slideable cutting tool support; rollers carried by said support; tracks for the reception of said rollers; and means for adjusting said rollers relatively to said tracks for determining the engagement of some of said rollers with said tracks on an upper surface and some on a lower surface.

10. In a trimming machine of the class described, a supporting body; a carriage; a pair of spaced rods; means for pivotally connecting one of the ends of said rods to said supporting body for swinging into position, for overlying said supporting body and for swinging upwardly and outwardly therefrom; an attachment member slideably mounted on each of said rods for mounting said carriage on said rods; means for locking each of said attachment members in fixed relation on said rods; and means for moving said carriage longitudinally of said rods and relatively to said attachment members subsequently to the fixing of said attachment members on said rods.

11. In a trimming machine of the class described, a supporting body; a carriage; a pair of spaced rods; means for pivotally connecting one of the ends of said rods to said supporting body for swinging into position, for overlying said supporting body and for swinging upwardly and outwardly therefrom; an attachment member slideably mounted on each of said rods for mounting said carriage on said rods; means for locking each of said attachment members in fixed relation on said rods; and a cam mechanism for moving said carriage back and forth a predetermined distance relatively to said attachment members longitudinally of said rods.

ARTHUR J. MORIN.